US009225536B2

(12) United States Patent
Jiao

(10) Patent No.: US 9,225,536 B2
(45) Date of Patent: Dec. 29, 2015

(54) METHOD AND DEVICE FOR IMPLEMENTING MBMS SERVICE WHEN RELAY NODE IS DEPLOYED IN NETWORK

(75) Inventor: Bin Jiao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 13/979,453

(22) PCT Filed: Jan. 12, 2012

(86) PCT No.: PCT/CN2012/070285
§ 371 (c)(1),
(2), (4) Date: Jul. 12, 2013

(87) PCT Pub. No.: WO2012/095013
PCT Pub. Date: Jul. 19, 2012

(65) Prior Publication Data
US 2013/0286927 A1 Oct. 31, 2013

(30) Foreign Application Priority Data
Jan. 14, 2011 (CN) .......................... 2011 1 0007985

(51) Int. Cl.
*H04W 72/00* (2009.01)
*H04L 12/18* (2006.01)
*H04W 76/00* (2009.01)
*H04B 7/155* (2006.01)
*H04W 84/04* (2009.01)
*H04B 7/26* (2006.01)

(52) U.S. Cl.
CPC .............. *H04L 12/18* (2013.01); *H04B 7/155* (2013.01); *H04L 12/189* (2013.01); *H04W 72/005* (2013.01); *H04W 76/002* (2013.01); *H04B 7/2606* (2013.01); *H04W 84/047* (2013.01)

(58) Field of Classification Search
None
See application file for complete search history.

(56) References Cited

U.S. PATENT DOCUMENTS

2010/0254295 A1* 10/2010 Ahn et al. ...................... 370/312
2013/0137364 A1*  5/2013 Redana et al. .................... 455/9

FOREIGN PATENT DOCUMENTS

CN   101848497 A   9/2010
CN   102026101 A   4/2011

(Continued)

OTHER PUBLICATIONS
International Search Report for PCT/CN2012/070285, mailed Apr. 19, 2012.

(Continued)

*Primary Examiner* — Alex Skripnikov
(74) *Attorney, Agent, or Firm* — Collard & Roe, P.C.

(57) ABSTRACT

Disclosed are a method and device for implementing an MBMS service when a relay node is deployed in a network. By employing the technical solution provided in embodiments of the present invention, a cell served by the relay node is used by a base station as the cell therefor, corresponding configuration information is transmitted to an MCE for registration, and a corresponding MBMS service is triggered. The base station is used as a proxy of the relay node to allow the scheduling of the MBMS service and data forwarding. Thus, the shortcoming in the prior art of the lack of support for the relay node to implement the MBMS service is obviated, and compatibility with the MBMS service is implemented on the relay node. The range of MBMS service coverage is expanded in a network via the deployment of the relay node. At the same time, on the basis of lower hardware construction investment costs, seamless support for the MBMS service is implemented throughout the network when the relay node is deployed.

21 Claims, 10 Drawing Sheets

(56) References Cited

FOREIGN PATENT DOCUMENTS

| | | |
|---|---|---|
| CN | 102075868 A | 5/2011 |
| WO | 2010/073403 | 7/2010 |
| WO | 2010/090215 | 8/2010 |

OTHER PUBLICATIONS

International Preliminary Report on Patentability and Written Opinion of the International Searching Authority for PCT/CN2012/070285, mailed Apr. 19, 2012.

* cited by examiner

PRIOR ART

PRIOR ART

MBMS GW: MBMS Gateway
MCE: Multi-Cell/Multicast Coordination Entity

M1: user plane interface
M2: E-UTRAN internal control plane interface
M3: control plane interface between E-UTRAN and EPC

METHOD AND DEVICE FOR IMPLEMENTING MBMS SERVICE WHEN RELAY NODE IS DEPLOYED IN NETWORK

CROSS REFERENCE TO RELATED APPLICATIONS

This application is the National Stage of PCT/CN2012/070285 filed on Jan. 12, 2012, which claims priority under 35 U.S.C. §119 of Chinese Application No. 201110007985.7 filed on Jan. 14, 2011, the disclosures of which are incorporated by reference. The international application under PCT article 21(2) was not published in English.

FIELD OF THE PRESENT INVENTION

The present invention relates to the field of communication technology, in particular to the method and device for implementing MBMS service when relay node is deployed in network.

BACKGROUND OF THE PRESENT INVENTION

In the future mobile communication system, such as: in B3G (Beyond Third Generation) or LTE-A (Long Term Evolution Advanced), higher peak value data rate and cell throughput will be provided, and wider bandwidth is needed at the same time, at present, there is little unallocated bandwidth below 2 GHz, part of or the whole bandwidth for B3G system can only be at higher frequency channel, for example, above 3 GHz. However, the higher frequency channel is, the faster attenuation of radio propagation and the shorter transmission distance will be, thus, in the same coverage area, more base stations are needed to guarantee continuous coverage, and network laying cost will be undoubtedly increased due to high construction cost of base station.

In order to solve network laying cost and coverage problem, manufacturers and standard organizations start to introduce Relay Node (RN) into cellular system to increase coverage.

FIG. 1 is the diagram of network architecture after RN is introduced into LTE-A system in prior art, RN is linked to core network through donor cell under evolved Node B (eNB), while RN itself and core network don't have direct wired interface, each RN can control one or several cells. Under this architecture, interface between User Equipment (UE) and RN is called Uu interface, and that between RN and DeNB is called Un interface.

To be specific, RN in the abovementioned architecture is featured with double identities:

(1) Firstly, RN is featured with the ID of UE, start of RN is similar to attach procedure in start of UE. RN has its own SGW (Serving Gateway)/PGW (Packet Data Network Gateway) and Mobility Management Entity (MME).

(2) Secondly, for UE connected to RN, RN is featured with the ID of eNB, and now downlink data of UE is required to be sent to service base station of UE (Via RN) from UE's own SGW/PGW, and sent to UE by RN at Uu interface.

FIG. 2 is the flow diagram of start procedure of RN in prior art, corresponding start procedure of RN can be described as below:

RRC connection is set up between RN and DeNB; RN sends attach request to MME; MME acquires authentication vector from HSS (Home Subscriber Server) and conducts authentication on RN; if authentication is passed, MME will set default bearer in SGW/PGW for RN, send initial context to DeNB (Donor evolved Node B) to set up request message, thus to set up context for access layer of RN in DeNB; DeNB sends RRC (Radio Resource Control) connection reconfiguration complete message and attach acceptance message sent to RN by MME to RN afterwards; RN returns to RRC connection reconfiguration to finish confirmation. In this way, RN sets up basic IP (Internet Protocol) connection.

Then O&M (Operation and Maintenance) equipment will download node configuration information to RN and conduct configuration on RN. RN can be in normal operation like base station after setting up necessary S1 interface and X2 interface.

Furthermore, FIG. 3 is the flow diagram of detach of RN from network in prior art, corresponding RN shutdown procedure can include detach procedure of RN as a regular UE from network as well as configuration update procedure towards neighbor eNB initiated by DeNB.

Furthermore, FIG. 4 is the structure diagram of MBMS (Multimedia Broadcast Multicast Service) system architecture in prior art. M1 interface refers to a pure user plane interface defined between eNB and MBMS GW, the interface provides unguaranteed user plane data transmission between MBMS GW and eNB. M2 interface refers to a control plane interface defined between eNB and MCE (Multi-cell/Multicast Coordination Entity), the interface is mainly used for MBMS session management function and MBMS scheduling information supply function. M3 interface refers to a to control plane interface defined between MME and MCE, the interface is mainly used for MBMS session management function.

In the procedure of implementing the embodiments of the present invention, at least the following problems existing in the current technologies were found:

In prior art, a regular eNB can control all or part of cells under control of eNB to participate in transmission of MBMS service based on scheduling information of MCE. However, if hybrid deploy scene of RN and regular eNB in network is considered, on one hand, RN doesn't support transmission of MBMS, on the other hand, major deploy scene of RN is used for expanding coverage (in expanded coverage area, UE can only receive signal from RN), thus, once UE is moved to RN coverage area, UE will not continue to receive MBMS service normally, which will seriously influence user experience.

SUMMARY OF THE PRESENT INVENTION

The embodiments of the present invention put forward the method and device for implementing MBMS service when relay node is deployed in network, so as to solve the lack of support for the relay node to implement the MBMS service in prior art. For achieving the above purpose, the embodiments of the present invention put forward a method for implementing MBMS service when relay node is deployed in network, comprising:

A base station receives configuration information (reported by a relay node) of all cells served by the relay node, said configuration information comprises MBMS service configuration information of all cells served by the relay node;

The base station sends the configuration information of all cells served by the relay node to an MCE;

When MBSFN Area configuration information returned from the MCE received from said base station contains MBSFN Area configuration information of one or several cells served by the relay node, the base station sends the above MBSFN Area configuration information of one or several cells served by the relay node to the relay node to configure one or several cells served by the relay node to support MBMS service.

On the other hand, the embodiments of the present invention provide a base station, comprising:

Receiving module, which is used for receiving configuration information of all cells served by the relay node and MB SFN Area configuration information returned from MCE, wherein said configuration information comprises MBMS service configuration information of all cells served by the relay node;

Sending module, which is used for sending the configuration information (received by the receiving module) of all cells served by the relay node to the MCE, and sending the information to said relay node so as to configure one or several cells served by the relay node to support MBMS service when MB SFN Area configuration information returned from the MCE received from said receiving module contains MBSFN Area configuration information of one or several cells served by the relay node.

On the other hand, the embodiments of the present invention further put forward a method for implementing MBMS service when relay node is deployed in network, comprising:

A relay node reports configuration information of all cells served by the relay node, said configuration information comprises MBMS service configuration information of all cells served by the relay node;

The relay node receives MBSFN Area configuration information of one or several cells served by the relay node from the base station;

The relay node configures corresponding cell to support MBMS service based on the MBSFN Area configuration information.

On the other hand, the embodiments of the present invention further provide a relay node, comprising:

Sending module, which is used for reporting configuration information of all cells served by the relay node to the base station, said configuration information comprises MBMS service configuration information of all cells served by the relay node;

Receiving module, which is used for receiving MBSFN Area configuration information of one or several cells served by the relay node;

Configuring module, which is used for configuring corresponding cell to support MBMS service based on MBSFN Area configuration information received by the receiving module.

Compared with the prior art, the embodiments of the present invention possess the following advantages:

By employing the technical solution provided in embodiments of the present invention, a cell served by the relay node is used by a base station as the cell therefore, corresponding configuration information is transmitted to an MCE for registration, and a corresponding MBMS service is triggered. The base station is used as a proxy of the relay node to allow the scheduling of the MBMS service and data forwarding. Thus, the shortcoming in the prior art of the lack of support for the relay node to implement the MBMS service is obviated, and compatibility with the MBMS service is implemented on the relay node. The range of MBMS service coverage is expanded in a network via the deployment of the relay node. At the same time, on the basis of lower hardware construction investment costs, seamless support for the MBMS service is implemented throughout the network when the relay node is deployed.

DETAILED DESCRIPTION OF THE EMBODIMENTS OF THE PRESENT INVENTION

As is mentioned in Background of the Present Invention, in LTE-A system, RN is introduced to increase network coverage. RN is connected with DeNB in wireless mode. The wireless interface between them is called Un interface. However, in prior art, due to system architecture, RN is lack of support for transmission of MBMS service, which influences implementation of expanding the MBMS service in the system containing RN.

In order to solve the abovementioned problems, embodiments of the present invention provides a method for implementing the MBMS service when a relay node is deployed in network. By improving start and shutdown processes of RN, DeNB is used as a proxy of a RN, cell under RN is used as cell under DeNB to conduct corresponding scheduling of the MBMS service, interaction of the MBMS service is implemented through DeNB by RN.

Figure 5:
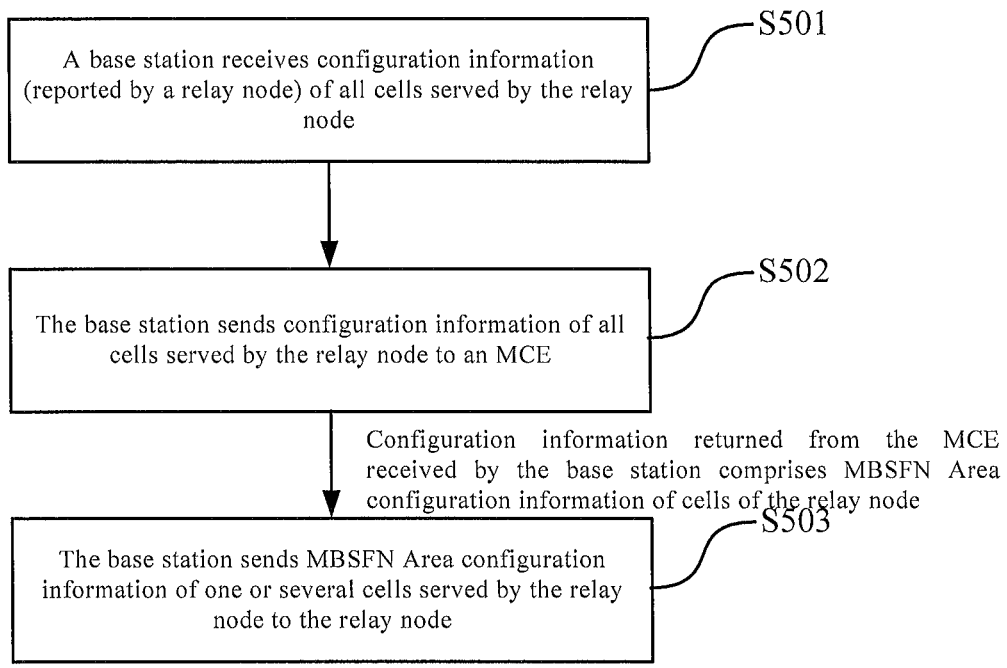
FIG. 5 is the flow diagram of a method for implementing MBMS service when relay node is deployed in network at base station side in the embodiments of the present invention.

FIG. 5 is the flow diagram of a method for implementing MBMS service when relay node is deployed in the embodiments of the present invention, comprising the following steps:

Step S501, a base station receives configuration information (reported by relay node) of all cells served by relay node.

Wherein, the configuration information comprises MBMS service configuration information of all cells served by relay node.

In specific implementation scenes, specific MBMS service configuration information of all cells served by relay node comprises:

MBMS Synchronization Area ID of all cells served by relay node; and/or,

MBMS Service Area List of all cells served by relay node.

In this step, to be specific, configuration information of all cells served and reported by relay node is acquired from OAM equipment by relay node.

In practical application scene, specific implementation process of the step is: a base station reports configuration information of all cells served by relay node through setup procedure of M2 interface after start of relay node.

Furthermore, in order to keep reference for follow-up operations, the base station can save correspondence between the ID information of relay node and that of all cells after the step.

Step S502, the base station sends the configuration information of all cells served by relay node to an MCE.

Viz. configuration information of all cells served by relay node is used by a base station as the cells therefor and sent to MCE.

Step S503, when the MBSFN Area (Multimedia Broadcast multicast service Single Frequency Network Area) configuration information returned from the MCE received from the base station comprises MBSFN Area configuration information of one or several cells served by relay node, the base station sends the MBSFN Area configuration information of one or several cells served by relay node to the relay node to configure one or several cells served by relay node to support MBMS service. Specific implementation process of the step comprises:

The base station acquires MBSFN Area configuration information of one or several cells served by relay node;

The base station sends the MB SFN Area configuration information acquired through M2 interface to the relay node.

It should be further noted that after Step S501, if the base station judges that the MBSFN Area configuration information of one or several cells served by relay node corresponds to one or several MBMS sessions, the technical solution in the embodiments of the present invention further comprises the following process:

(1) The base station sends MBMS start request message to the relay node, requesting to create MBMS session with one or several cells served by relay node.

To be specific, the MBMS start request message sent by the base station to relay node includes the following two conditions:

Condition I, the base station sends a piece of MBMS session start request message to the relay node, said MBMS session start request message carries a request to trigger creating several MBMS sessions.

Condition II, the base station sends many pieces of MBMS session start request message to the relay node separately, and each MBMS session request message carries a request to trigger creating an MBMS session.

In practical application, it depends on actual demands to apply specific above-mentioned conditions to send MBMS session start request message, this change doesn't influence protection scope of the present invention.

(2) The base station receives creating condition of MBMS session in the start request message returned from the relay node.

(3) The base station sends user plane data corresponding to one or several cells with which MBMS session has been created to the relay node.

After sending user plane data corresponding to one or several cells with which MBMS session has been created to relay node, the base station receives MBMS scheduling response message returned from relay node.

Through the abovementioned process, the MBMS service is implemented for the relay node according to proxy of the base station, furthermore, process of embodiments of the present invention for corresponding shutdown of MBMS service due to shutdown of the relay node itself and other causes is described as follows:

When the base station confirms that the relay node cannot continue to conduct MBMS service, the base station sends request message for deleting configuration information of one or several cells served by the relay node, and stops forwarding MBMS service to the relay node.

For the situation that corresponding correspondence is saved in Step S501, when the base station confirms that the relay node cannot continue to conduct MBMS service, the base station still needs to delete the saved correspondence between ID information of relay node and that of all cells served by relay node, and needs to send release complete notification message of M2 interface to the relay node after deleting.

In specific implementation scenes, modes confirmed by the abovementioned base station that relay node cannot continue to conduct MBMS service include the following two types:

(1) The base station receives M2 process initiated and informed by relay node of stopping receiving MBMS service.

(2) When M2 interface between the base station and relay node is just borne at an SCTP relevance of low-layer SCTP (Stream Control Transmission Protocol), the base station receives SCTP dissociation procedure triggered by relay node.

It should be noted that in practical applications, it can be set and regulated according to actual demand for specific content for mode of the base station to confirm that relay node cannot continue to conduct MBMS service. this change doesn't influence protection scope of the present invention.

Figure 6:
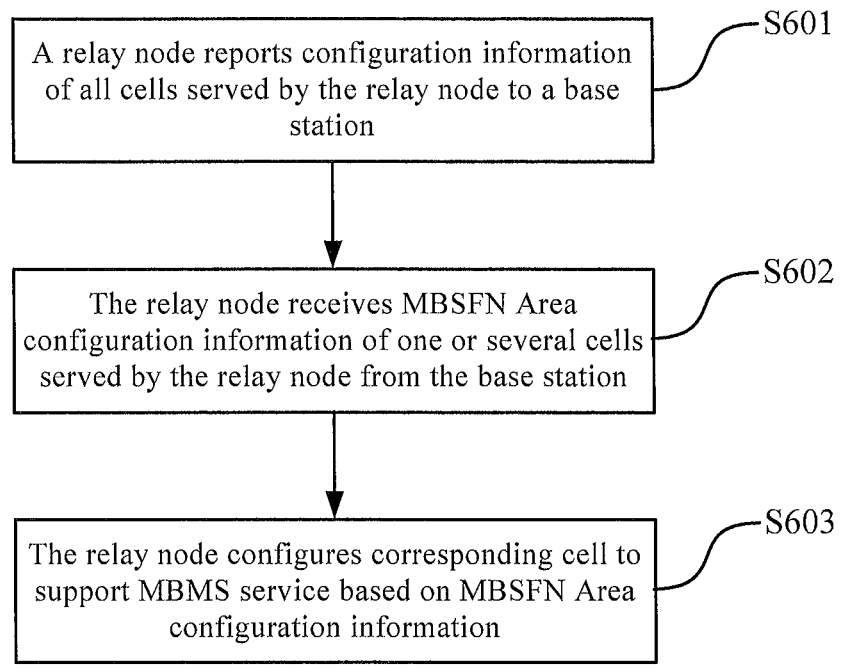
FIG. 6 is the flow diagram of a method for implementing MBMS service when relay node is deployed in network at relay node side in the embodiments of the present invention.

The abovementioned process is a procedure in the embodiments of the present invention for implementing the MBMS service when relay node is deployed in network at base station side. Furthermore, the embodiments of the present invention provide a procedure for implementing the MBMS service when relay node is deployed in network at relay node side, refer to FIG. 6 for the flow diagram, including the following steps:

Step S601, a relay node reports configuration information of all cells served by relay node to a base station.

Wherein, the configuration information comprises MBMS service configuration information of all cells served by relay node.

In specific implementation scenes, specific MBMS service configuration information of all cells served by relay node includes:

MBMS Synchronization Area ID of all cells served by relay node; and/or,

MBMS Service Area List of all cells served by relay node.

The following process is included before this step:

The relay node acquires configuration information of all cells served by relay node from OAM equipment, the configuration information comprises MBMS service configuration information of all cells served by relay node.

In practical application scenes, specific implementation process of the step is: the relay node reports configuration information of all cells served by relay node through setup procedure of M2 interface after start of the relay node.

Step S602, the relay node receives MBSFN Area configuration information of one or several cells served by relay node from a base station.

Step S603, the relay node configures corresponding cell to support MBMS service based on MBSFN Area configuration information.

After the step, the relay node receives data information corresponding to the MBMS service from the base station to implement data transmission of the MBMS service.

To be specific, after configuration information of all cells served by relay node is reported to the base station by the relay node in Step S601, the following process is further included in the technical solution:

(1) The relay node receives MBMS session start request message from the base station, the MBMS session start request message requests to create MBMS session between the base station and one or several cells served by relay node.

(2) The relay node returns creating condition of MBMS session in the start request message to the base station.

(3) The relay node receives user plane data corresponding to one or several cells with which MBMS session has been created from the base station. In specific implementation scenes, for the technical process described in the aforementioned (1), after Step S601, the relay node may also receive MBMS session start request message from the base station, including the following two conditions:

Condition I, the relay node receives a piece of MBMS session start request message from relay node, said MBMS session start request message carries a request to trigger creating several MBMS sessions.

Condition II, the relay node receives many pieces of MBMS session start request message from the base station, and each MBMS session start request message carries a request to trigger creating an MBMS session.

Correspondingly, no matter MBMS session start request message is received in any to abovementioned mode, the relay node will feed back creating result to the base station after corresponding MBMS session creating process.

Furthermore, after Step 5603, in the technical solution in the embodiments of the present invention, the relay node can also inform the base station that the relay node cannot continue to conduct MBMS service in the following modes:

The relay node initiates M2 process of stopping receiving MBMS service and informs it to the base station; or, When M2 interface between the base station and relay node is just borne at an SCTP relevance of low-layer SCTP, the relay node triggers SCTP dissociation process towards the base station.

Compared with the prior art, the embodiments of the present invention possess the following advantages:

By employing the technical solution provided in embodiments of the present invention, a cell served by the relay node is used by a base station as the cell therefore, corresponding configuration information is transmitted to an MCE for registration, and a corresponding MBMS service is triggered. The base station is used as a proxy of the relay node to allow the scheduling of the MBMS service and data forwarding. Thus, the shortcoming in the prior art of the lack of support for the relay node to implement the MBMS service is obviated, and compatibility with the MBMS service is implemented on the relay node. The range of MBMS service coverage is expanded in a network via the deployment of the relay node. At the same time, on the basis of lower hardware construction investment costs, seamless support for the MBMS service is implemented throughout the network when the relay node is deployed.

The technical solution in the embodiments of the present invention is described in combination with specific application scenes.

Figure 7:
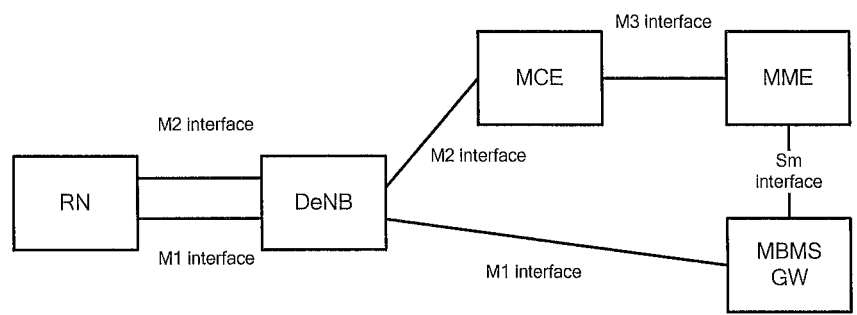
FIG. 7 is the diagram of MBMS system architecture in network system containing RN in the embodiments of the present invention.

Firstly, refer to FIG. 7 for diagram of MBMS system architecture in the network system containing RN. For illustrative purpose, processes of start and shutdown of RN in embodiments of the present invention are separately described.

Main idea of the technical solution in the embodiments of the present invention lies in:

(1) M2 interface is set up based on configuration of OAM and corresponding DeNB after start of RN. Configuration information of cell under RN is saved by DeNB and sent to MCE by DeNB as the cell information therefore, MCE saves the cell information from DeNB, generates new MBSFN configuration and sends it to DeNB.

After the above process, DeNB provides proxy function of M1 and M2 interfaces for RN, DeNB acts as proxy for RN with MBMS session at M1 interface borne at UN interface based on context information of MBMS session, MBSFN area information configured for RN cell by MCE as well as MBMS Service Area information belonging to RN cell.

(2) Before shutdown of RN (such as indicated by OAM), DeNB judges whether RN is to be shut down soon based on explicit signaling from RN or connection situation of UN interface with RN, once DeNB judges that RN is shut down, the DeNB will inform RN cell shutdown message to MCE, and MCE will delete all context information relating to RN cell, generate new MBSFN configuration and send it to DeNB. DeNB deletes its own proxy MBMS session bearing information saved at UN interface and releases corresponding transmission source at UN interface, on the other hand, DeNB deletes all configuration information of RN cell.

Furthermore, four application scenes are given for start and shutdown of RN, the technical solution based on the abovementioned technical idea is described as below:

Application Scene I

Figure 8:
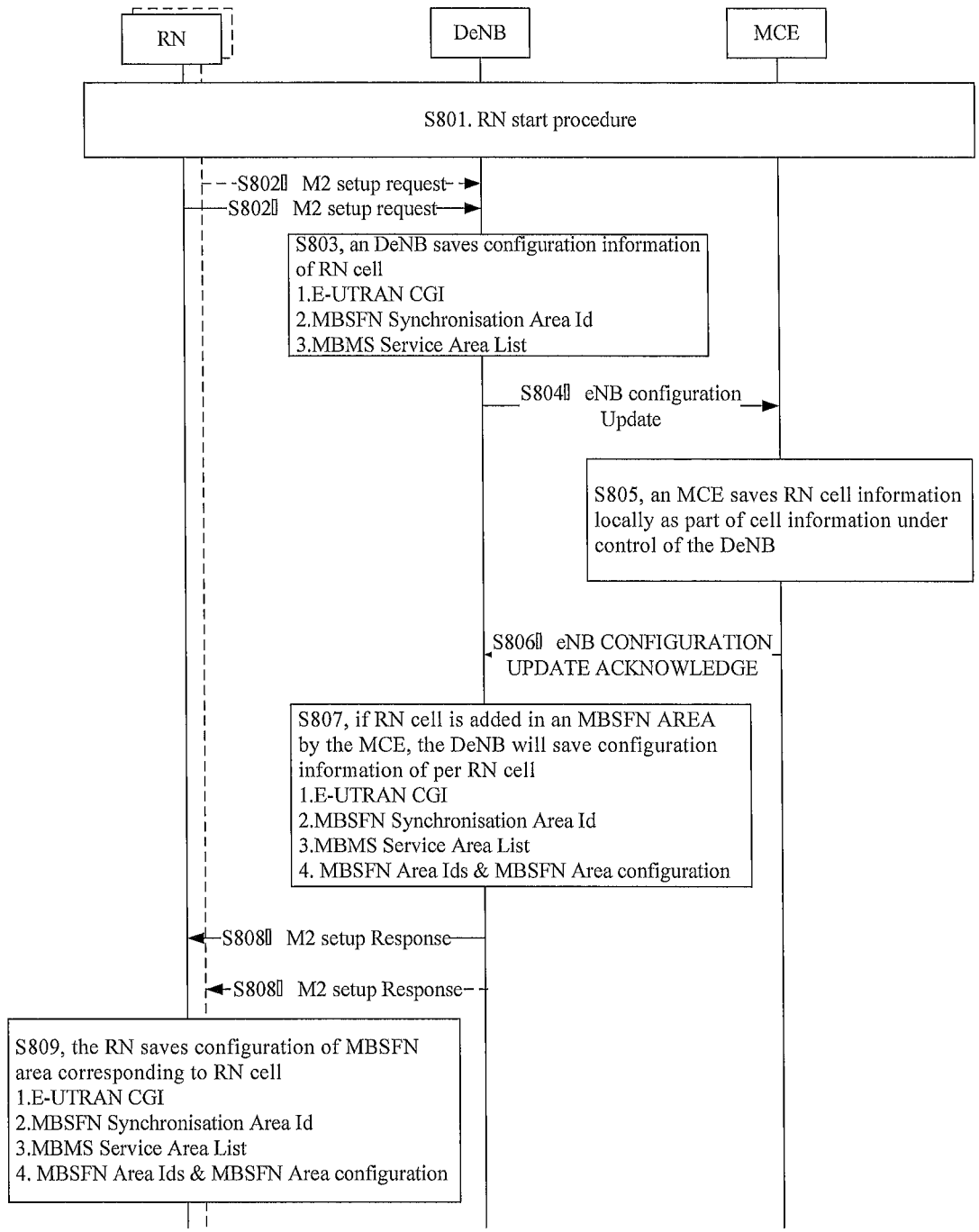
FIG. 8 is the flow diagram of a method for implementing MBMS service when relay node is deployed in network in application scene I in the embodiments of the present invention.

FIG. 8 is the flow diagram of a method for implementing MBMS service when relay node is deployed in network in Application Scene I in the embodiments of the present invention, during start of RN, RN cell information is sent to DeNB, as the proxy of RN, DeNB sends RN cell information to an MCE for registration.

Figure 1:
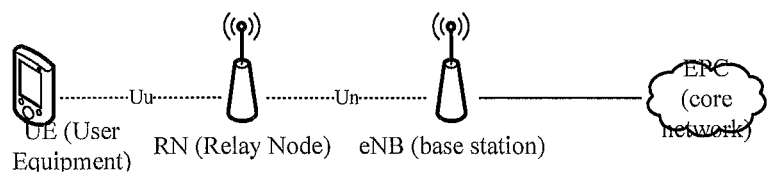
FIG. 1 is the structure diagram of network architecture after RN is introduced into LTE-A system in prior art.
Figure 2:
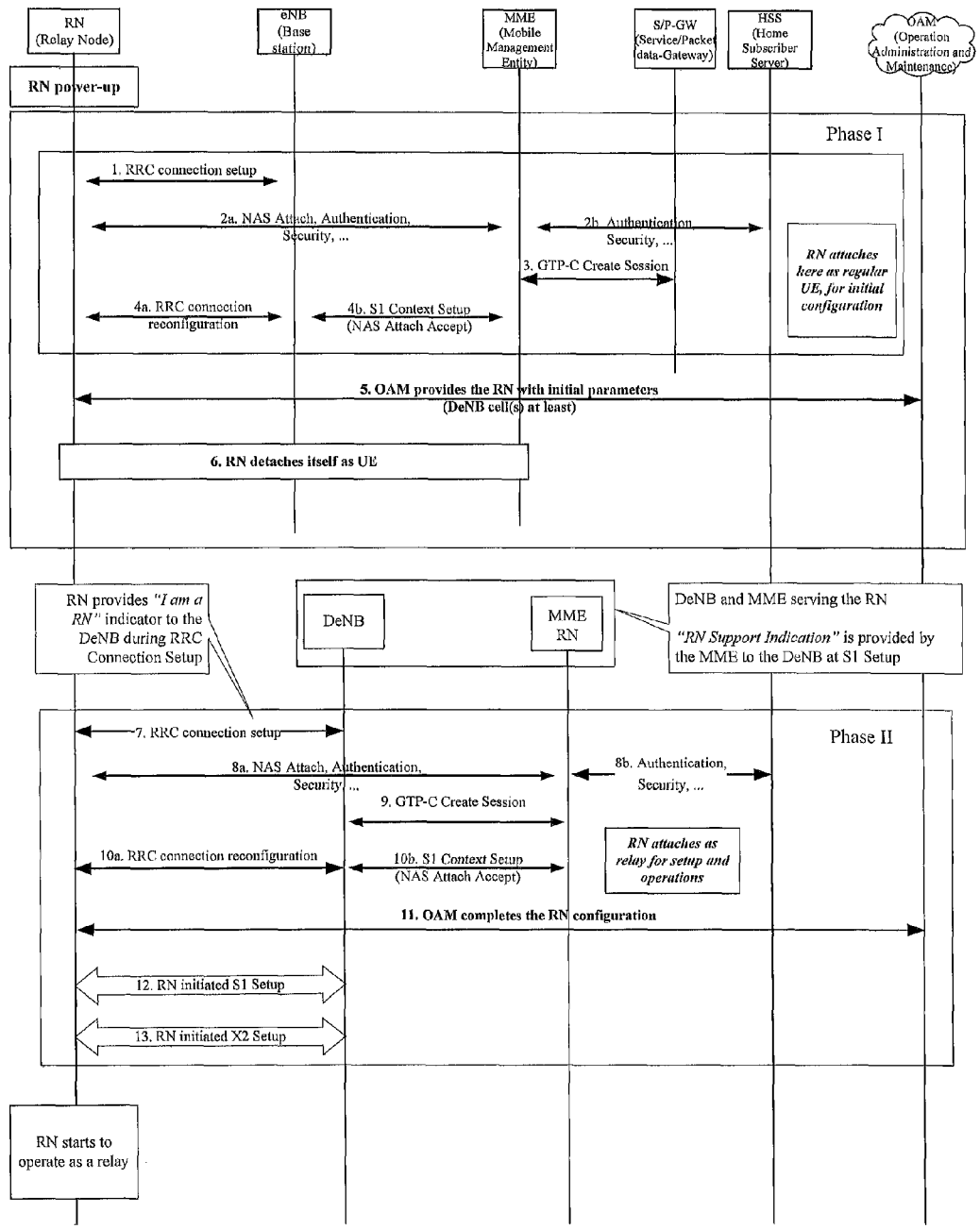
FIG. 2 is the flow diagram of start procedure of RN in prior art.

To be specific, the following process is included:

Step S801, at first, refer to the steps in the aforementioned FIG. 2 to complete all steps of RN start in prior art, in addition, for detailed description of the above process in prior art, please refer to TS 36.300 Va0, which will not be explained in detail here again.

It should be noted that during start of RN, besides information acquired from OAM by RN in prior art, in the embodiment, RN also acquires configuration information for support of MBMS service by RN cell from OAM, for example: MBMS Synchronization Area ID and MBMS Service Area List.

Step S802, based on MBMS property configuration of RN cell by OAM, RN initiates setup procedure of M2 interface towards DeNB during start of RN, and sends MBMS property configuration information of RN cell to DeNB. Such as the abovementioned MBSFN Synchronization Area ID and MBMS Service Area List of RN cell.

Step S803, with RN Cell ID as index, DeNB saves MBMS configuration information of RN cell. In addition, under the same RN equipment, all RN cells information is made related to RN equipment name (such as RN Name) by DeNB.

Step S804, by update message for eNB configuration, RN cell information is used by DeNB as part of the cell information therefor and sent to MCE by the DeNB.

For the scene of start of several RNs, cell list sent to MCE by DeNB may contain RN cell information from different RNs, this change doesn't influence protection scope of the present invention.

Step S805, MCE saves RN cell information locally as part of the cell information under control of DeNB.

Step S806, according to its own algorithm, MCE selects part of or the whole cells under control of DeNB to start MB SFN transmission, and initiates update process for MB SFN Area configuration of all cells involved in MBSFN transmission.

Step S807, DeNB saves MBSFN Area configuration information from MCE locally with cell as index.

Step S808, based on the received MBSFN Area configuration information (cell granularity), DeNB extracts MBSFN Area configuration information of RN cells related to some RN equipment, and sends the information to corresponding RN through M2 setup complete message.

Step S809, based on received information, RN saves MBSFN Area configuration information of RN cell and configures MBSFN Area of RN cell under RN.

Application Scene II

Figure 9:
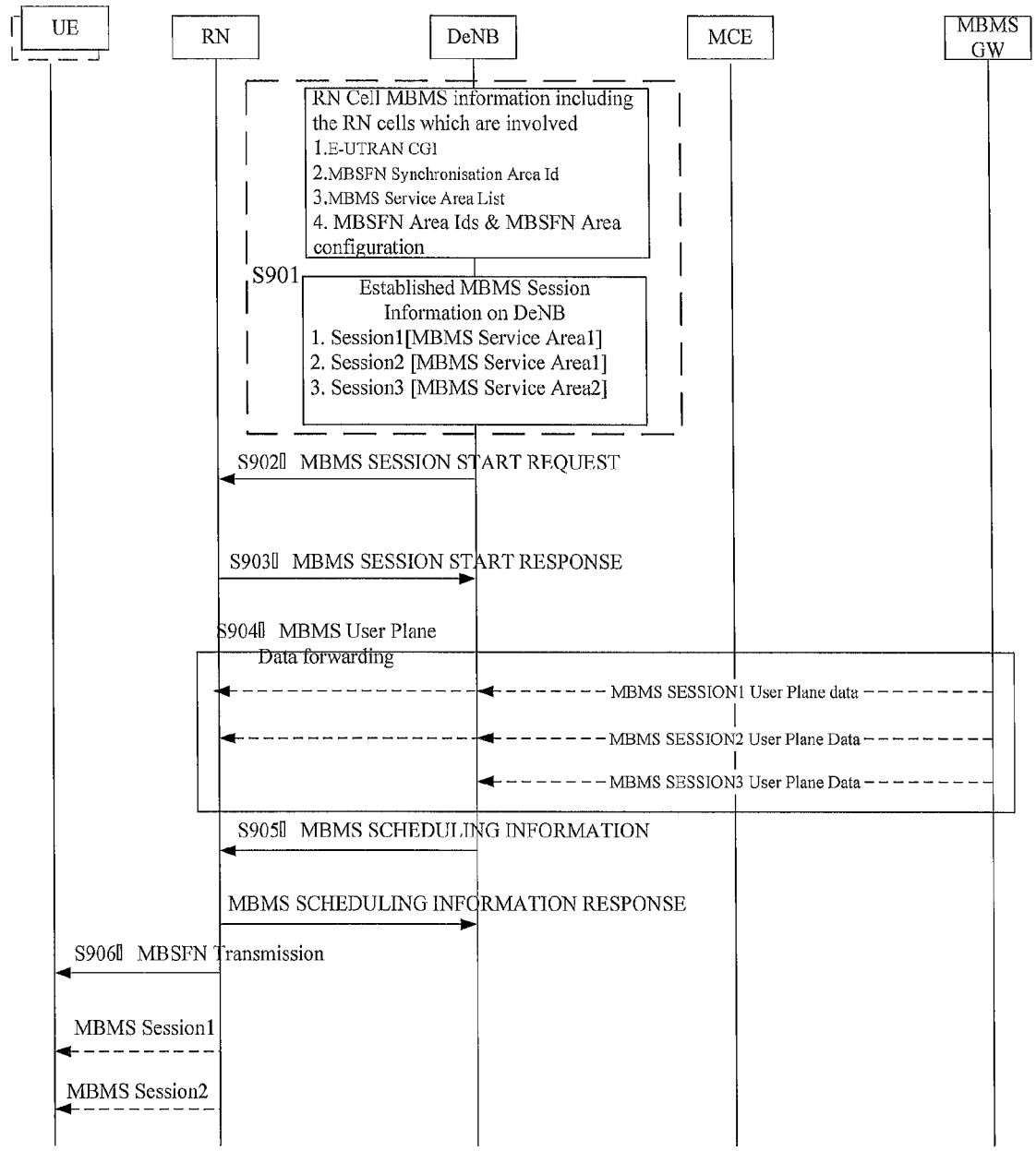
FIG. 9 is the flow diagram of a method for implementing MBMS service when relay node is deployed in network in application scene II in the embodiments of the present invention.

FIG. 9 is the flow diagram of a method for implementing MBMS service when relay node is deployed in network in Application Scene II in the embodiments of the present invention, during start of RN, DeNB conducts matching based on configuration information of RN cell as well as MBMS session information saved by DeNB itself, for matched MBMS session, DeNB will trigger RN to establish context for corresponding MBMS session.

To be specific, the following process is included:

Step S901, based on configuration information of RN cell acquired in process of Application Scene I and context of the session created by DeNB before start of RN, the DeNB triggers RN to establish context for corresponding session.

In the application scenes, assume that 3 MBMS sessions are being transmitted by the DeNB during start of RN, in the assumption, the DeNB judges that RN is needed for Session 1 and Session 2 transmission based on MBMS Service Area configurations of RN cell and MBMS session.

Step S902, the DeNB triggers corresponding MBMS session by MBMS session start request message.

Specific triggering modes include:

Mode I, the DeNB requests the RN to establish contexts for several MBMS sessions simultaneously by MBMS session start request message.

Mode II, the DeNB can send several MBMS Session start request messages in parallel, each MBMS session start message will trigger creating of an MBMS Session.

In practical application scenes, it depends on actual demands to apply specific mode, this change doesn't influence protection scope of the present invention.

Step S903, the RN feeds back creating situation of each MBMS session (maybe only part of MBMS sessions in MBMS session start request are created) based on MBMS Session list in MBMS session start request message.

If in Step S902, the DeNB adopts Mode II to create several MBMS Sessions by several parallel MBMS session start requests, then RN is required to respond each MBMS session start request.

Step S904, based on created MBMS session list, the DeNB forwards user plane data corresponding to MBMS session to the RN through Un interface.

Step S905, based on MBSFN Area configuration information of RN Cell, the DeNB sends user plane scheduling information of corresponding session to RN by MBMS scheduling information.

In this embodiment, specific user plane scheduling information refers to that of Session 1 and Session 2.

Step S906, based on the received scheduling information, the RN transmits MBSFN of Session 1 and Session 2 at Uu interface, and feeds back MBMS scheduling response message to the DeNB.

Application Scene III

Figure 10:
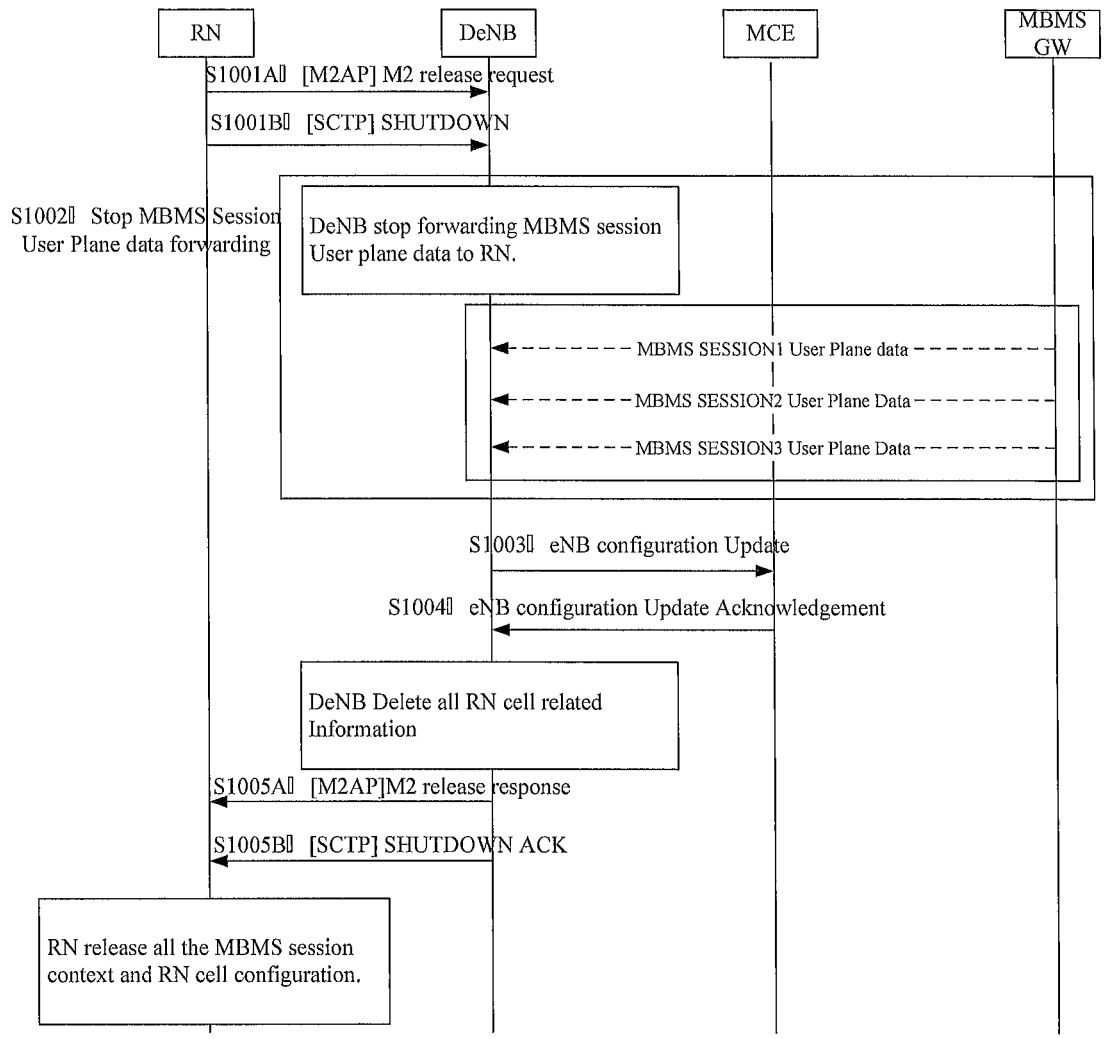
FIG. 10 is the flow diagram of a method for implementing MBMS service when relay node is deployed in network in application scene III in the embodiments of the present invention.

FIG. 10 is the flow diagram of a method for implementing MBMS service when relay node is deployed in network in Application Scene III in the embodiments of the present invention.

Specific process includes:

During shutdown of RN, the RN informs the DeNB of RN MBMS function shutdown information by explicit signaling.

The RN can inform the DeNB in two modes, M2 interface releases and indicates the RN to stop supporting MBMS function:

Mode I, the RN informs the DeNB to stop supporting MBMS (such as release request of M2 interface) by triggering a new M2 process.

For specific Step S1001A shown in FIG. 10, the RN may be configured to stop supporting MBMS service transmission based on OAM configuration or strategy of the operator, the RN informs the DeNB by request message released by M2 that the RN to cannot continue to transmit MBMS (Note: RN may continue to support transmission of unicast data afterwards).

Mode II, when M2 interface is just borne at an SCTP relevance of low-layer SCTP, SCTP layer of the RN indicates release process of DeNB M2 interface in implicit mode by triggering shutdown process of SCTP relevance corresponding to the M2 interface.

For specific Step S1001B shown in Fig. 10, M2AP protocol operates above SCTP layer, the RN can then inform M2 interface release of destination interface by releasing SCTP relevance used by M2 interface, thus to indicate RN cell in implicit mode to stop sending MBMS information.

Figure 11:
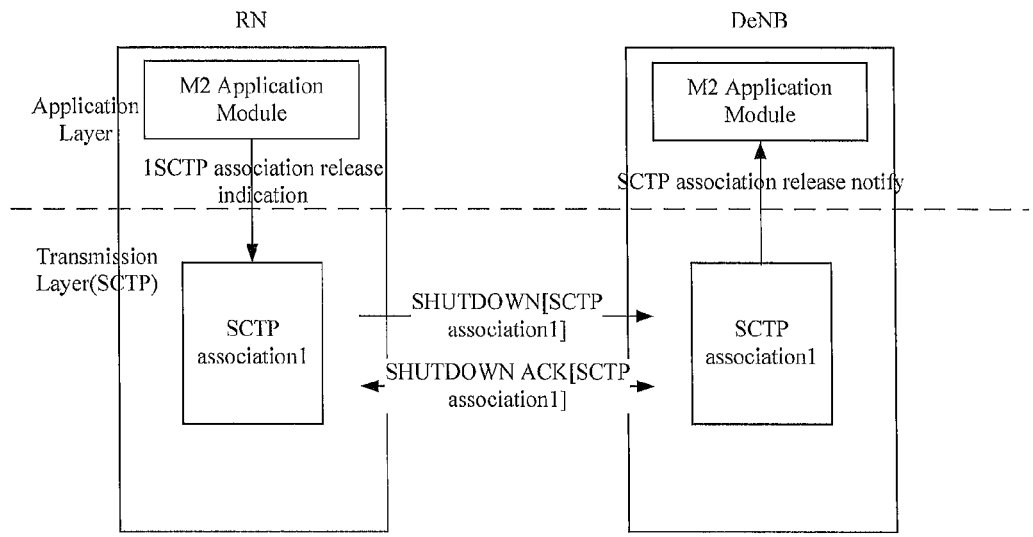
FIG. 11 is the diagram of interlayer interaction process between M2AP and SCTP in the embodiments of the present invention.

Refer to FIG. 11 for diagram of interlayer interaction process between M2AP and SCTP in Mode II.

Step S1002, the DeNB stops downlink forwarding of MBMS Session user plane data to RN.

Step S1003, the DeNB deletes configuration information relating to RN cell and MBMS transmission from its cell, and sends updated list information to the MCE.

Step S1004, the MCE updates DeNB cell list and conducts reconfiguration.

Corresponding to the aforementioned Step S1001A, process of Step S1005A in embodiments of the present invention is: the DeNB deletes all configuration information relating to RN cell, and informs RN that M2 interface can be released, the RN releases all of its saved MBMS session context and configuration information relating to RN cell and MBMS transmission after receiving the message.

Corresponding to the aforementioned Step S1001B, process of Step S1005B in embodiments of the present invention is: the DeNB releases response message through SCTP relevance corresponding to M2 interface, and indicates release completion of M2 interface in implicit mode.

During the process when the DeNB is triggering Step S 1003 and Step S1005A or Step S1005B, the abovementioned temporal relation is followed all the time, for example, Step S1005A or Step S1005B could be executed before Step S1003, or parallel execution of Step S1005A or Step S1005B with Step S1003 is possible.

Application Scene IV

Figure 12:
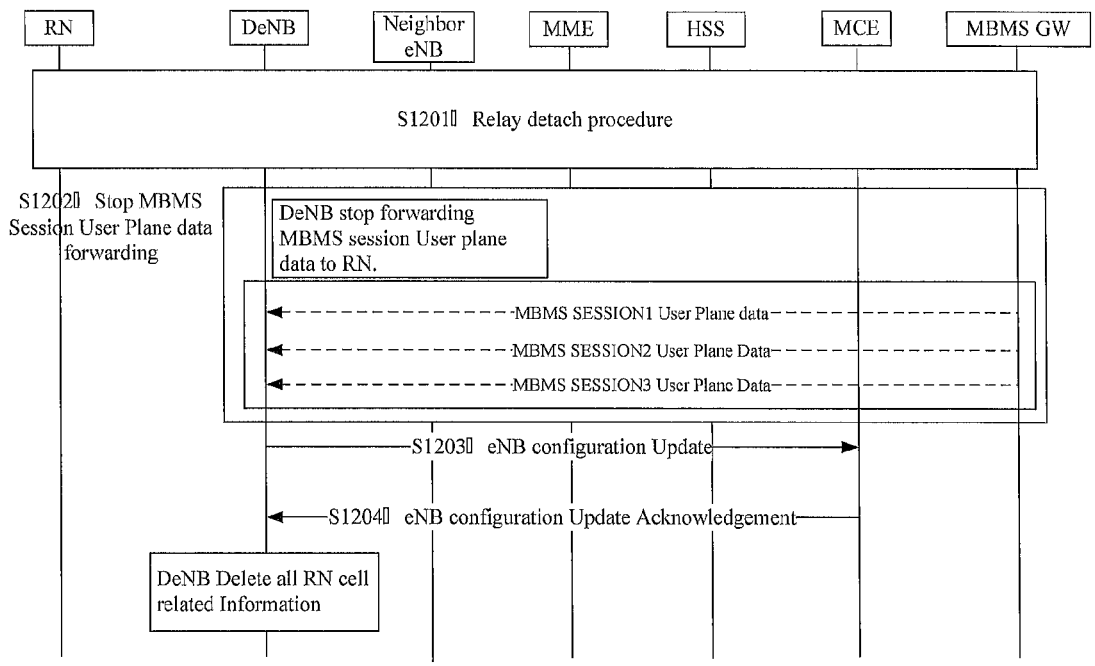
FIG. 12 is the flow diagram of a method for implementing MBMS service when relay node is deployed in network in application scene IV in the embodiments of the present invention.

FIG. 12 is the flow diagram of a method for implementing MBMS service when relay node is deployed in network in Application Scene IV in the embodiments of the present invention.

Specific process includes:

Step S1201, during shutdown of RN, the DeNB initiates the RN to conduct detach procedure in network.

Figure 3:
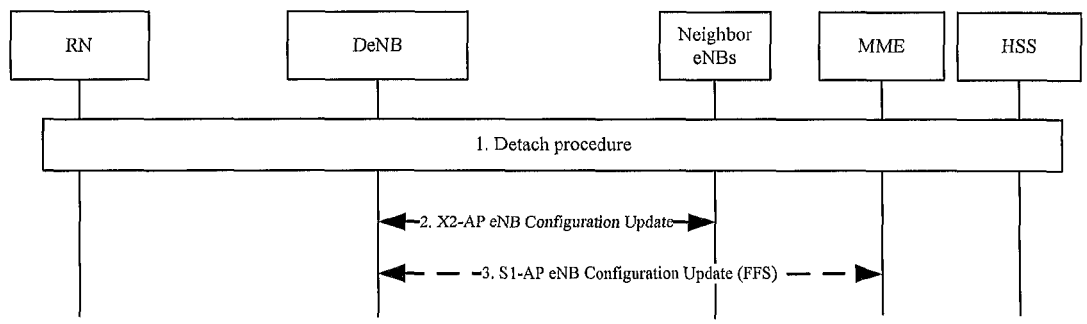
FIG. 3 is the flow diagram of detach procedure of RN from network in prior art.
Figure 4:
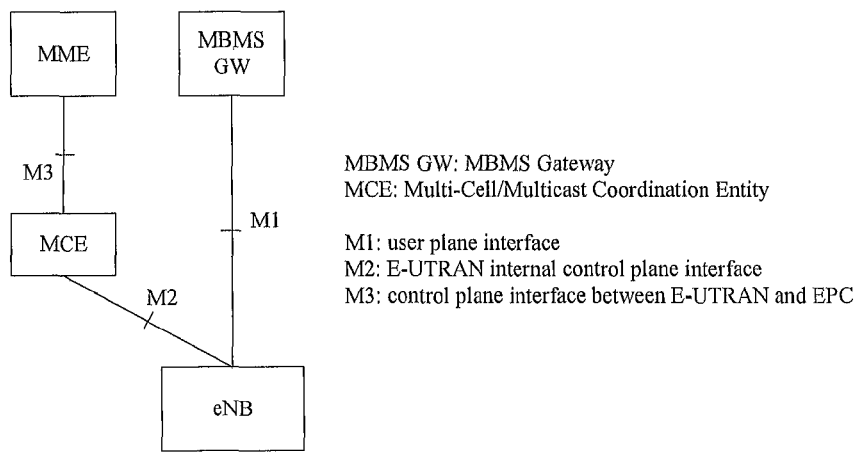
FIG. 4 is the structure diagram of MBMS system architecture in prior art.

In prior art, detach procedure of RN in network is shown in FIG. 3, please refer to 3GPP TS 36.300 Va10 for more details (it is required to execute follow-up extra steps when Relay is involved in MBMS transmission).

Step S1202, the DeNB stops downlink forwarding of MBMS Session user plane data to the RN.

Step S1203, the DeNB deletes RN cell from its own cell list, and sends updated list information to the MCE.

Step S1204, the MCE updates DeNB cell list, and conducts reconfiguration, the DeNB deletes all configuration information relating to RN cell.

Compared with the prior art, the embodiments of the present invention possess the following advantages:

By employing the technical solution provided in embodiments of the present invention, a cell served by the relay node is used by a base station as the cell therefore, corresponding configuration information is transmitted to an MCE for registration, and a corresponding MBMS service is triggered. The base station is used as a proxy of the relay node to allow the scheduling of the MBMS service and data forwarding. Thus, the shortcoming in the prior art of the lack of support for the relay node to implement the MBMS service is obviated, and compatibility with the MBMS service is implemented on the relay node. The range of MBMS service coverage is expanded in a network via the deployment of the relay node. At the same time, on the basis of lower hardware to construction investment costs, seamless support for the MBMS service is implemented throughout the network when the relay node is deployed.

Figure 13:
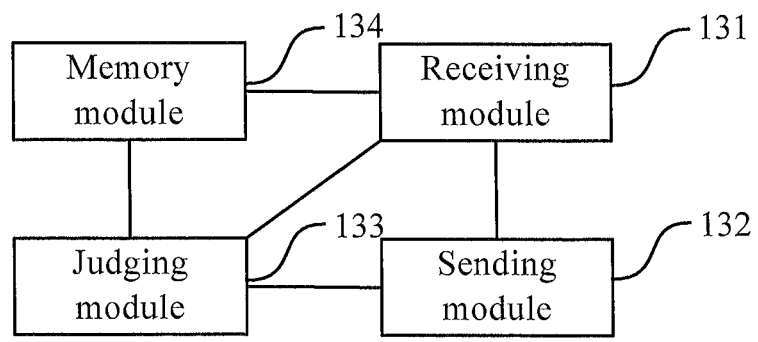
FIG. 13 is the structure diagram of a base station in the embodiments of the present invention.

In order to implement technical solution in the embodiments of the present invention, the embodiments of the present invention put forward a base station, refer to FIG. 13 for its structure diagram, to be specific, including:

Receiving module 131, which is used for receiving configuration information of all cells served by the relay node and MBSFN Area configuration information returned from an MCE, wherein, the configuration information comprises MBMS service configuration information of all cells served by the relay node;

Sending module 132, which is used for sending the configuration information (received by receiving module 131) of all cells served by the relay node to the MCE, and sending the information to the relay node, so as to configure one or several cells served by the relay node to support MBMS service when MBSFN Area configuration information returned from the MCE received from receiving module 131 comprises MBSFN Area configuration information of one or several cells served by the relay node.

In practical application, receiving module 131 is used for:

Reporting configuration information of all cells served by relay node by M2 interface setup procedure after start of relay node.

Furthermore, sending module 132 is used for:

Acquiring MBSFN Area configuration information of one or several cells served by relay node and sending this information to the relay node through M2 interface when MBSFN Area configuration information returned from MCE received from receiving module 131 comprises MBSFN Area configuration information of one or several cells served by relay node.

In specific implementation scenes, a base station also includes:

Judging mode 133, which is used for judging whether MBMS service configuration information (received by receiving module 131) of one or several cells served by relay node corresponds to one or several MBMS sessions created by the base station;

When judging result by judging module 133 is yes, sending module 132 is also used for sending MBMS session start request message to relay node, requesting to create MBMS session with one or several cells served by relay node, and sending user plane data corresponding to one or several cells with which MBMS session has been created to the relay node.

Judging module 133 is also used for judging whether the relay node can continue to conduct MBMS service;

When judging module 133 judges that the relay node cannot continue to conduct MBMS service, sending module 132 is also used for sending request message for deleting configuration information of one or several cells served by relay node to the MCE, and stopping forwarding MBMS service to the relay node.

Furthermore, the abovementioned base station also includes:

Memory module 134, which is used for saving correspondence between ID information of relay node and that of all cells served by relay node, and deleting the saved correspondence when judging module 133 judges that the relay node cannot continue to conduct MBMS service.

Figure 14:
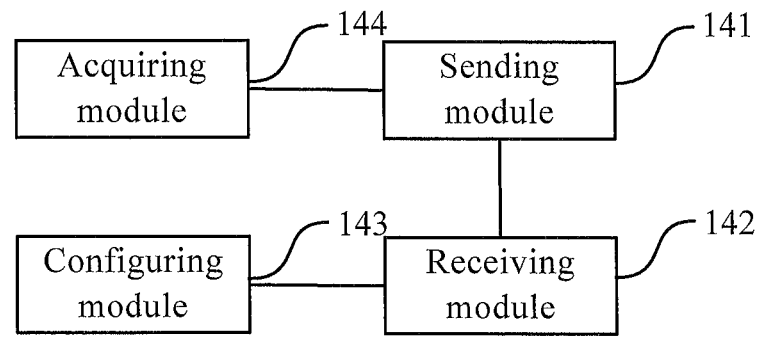
FIG. 14 is the structure diagram of a relay node in the embodiments of the present invention.

On the other hand, the embodiments of the present invention also provide a relay node with structure diagram shown in FIG. 14, including:

Sending module 141, which is used for reporting configuration information of all cells served by relay node to a base station, the configuration information comprises MBMS service configuration information of all cells served by relay node;

Receiving module 142, which is used for receiving MBSFN Area configuration information of one or several cells served by relay node from the base station;

Configuring module 143, which is used for configuring corresponding cell to support MBMS service based on MBSFN Area configuration information received by receiving module 142.

Furthermore, the abovementioned relay node also includes:

Acquiring module 144, which is used for acquiring configuration information of all cells served by relay node from OAM equipment, the configuration information comprises MBMS service configuration information of all cells served by relay node.

To be specific, receiving module 142 is also used for receiving data information corresponding to MBMS service from the base station.

In practical application scenes, receiving module 142 is also used for receiving MBMS session start request message, in the request message, the base station is requested to create MBMS session with one or several cells served by relay node;

Sending module 141 is also used for returning MBMS session creating situation in the request message to the base station;

Receiving module 142 is also used for receiving user plane data of one or several cells with which MBMS session has been created from the base station.

To be specific, sending module 141 is also used for informing the base station that the relay node cannot continue to conduct MBMS service in the following mode:

Initiating M2 process of stopping receiving MBMS service and informing it to the base station; or, Triggering SCTP dissociation process towards the base station when M2 interface between the relay node and base station is just borne at an SCTP relevance of low-layer SCTP.

Compared with the prior art, the embodiments of the present invention possess the following advantages:

By employing the technical solution provided in embodiments of the present invention, a cell served by the relay node is used by a base station as the cell therefore, corresponding configuration information is transmitted to an MCE for registration, and a corresponding MBMS service is triggered. The base station is used as a proxy of the relay node to allow the scheduling of the MBMS service and data forwarding. Thus, the shortcoming in the prior art of the lack of support for the relay node to implement the MBMS service is obviated, and compatibility with the MBMS service is implemented on the relay node. The range of MBMS service coverage is expanded in a network via the deployment of the relay node. At the same time, on the basis of lower hardware construction investment costs, seamless support for the MBMS service is implemented throughout the network when the relay node is deployed.

Through the description of the embodiments above, the technical personnel in this field can understand clearly that the present invention can be implemented by hardware or software and necessary current hardware platform. Based on this understanding, the technical scheme of the present invention can be embodied by a form of software products which can be stored in a nonvolatile storage medium (such as CD-ROM, U disk, mobile hard disk, etc.), including a number of instructions for making a computer device (such as personal computers, servers, or network equipment, etc.) implement the methods described in the embodiments of the present invention.

The technical personnel in this field can be understood that the illustration is only schematic drawings of a preferred implementation scene, and the module or process is not necessary for the implementation of embodiments of the present invention.

The technical personnel in this field can be understood that the modules can be distributed in device of the embodiments according to the description of the embodiments above, and also can be varied in one or multiply devices of the embodiments. The modules of the embodiments can be combined into a module, and also can be further split into several sub-modules.

The number of the embodiments is only to describe, it does not represent the pros and cons of the implementation scenes.

The descriptions above are just preferred several implementation scenes of embodiments of the present invention. It should be pointed that, for general technical personnel in this field, some improvement and decorating can be done, which should be as the protection scope of the present invention.

The invention claimed is:

1. A method for implementing MBMS (Multimedia Broadcast Multicast Service) service when a relay node is deployed in network, wherein, the method comprises the following steps:

providing a the base station receiving configuration information, reported by the relay node, of all cells served by the relay node, the configuration information comprises MBMS service configuration information of all cells served by the relay node, wherein the configuration information, reported by said relay node, of all cells served by the relay node is acquired from OAM (Operation Administration and Maintenance) equipment by the relay node;

sending via the base station said configuration information of all cells served by the relay node to an MCE (Multi-cell/Multicast Coordination Entity);

wherein when MBSFN (Multimedia Broadcast multicast service Single Frequency Network) Area configuration information returned from the MCE received from said base station contains MBSFN Area configuration information of one or several cells served by the relay node, the base station sending the above MBSFN Area configuration information of said one or several cells served by the relay node to the relay node to configure said one or several cells served by the relay node to support MBMS service, the MBSFN Area configuration information of said one or several cells served by the relay node includes:

MBMS Synchronization Area ID of all cells served by the relay node; and/or, MBMS Service Area List of all cells served by the relay node.

2. The method according to claim 1, wherein, said base station receiving the configuration information, reported by at least one relay node, of all cells served by the relay node, with the details below:

after receiving the start of the relay node, said base station reporting the configuration information of all cells served by the relay node through the setup procedure of M2 interface; and/or, after said base station receiving the configuration information, reported by said at least one relay node, of all cells served by the relay node, further comprising:

said base station saving correspondence between ID information of the relay node and that of all cells served by the relay node; and/or, said base station sending the configuration information of all cells served by the relay node to the MCE, with the details below:

wherein the base station taking the configuration information of all cells served by the relay node as the cells and sending the configuration information to the MCE.

3. The method according to claim 1, wherein, when said MBSFN Area configuration information returned from the MCE received by said base station contains said MBSFN Area configuration information of said one or several cells served by the relay node, said base station sending the MBSFN Area configuration information of said one or several cells served by the relay node to the relay node, with the details below:

said base station acquiring said MBSFN Area configuration information of said one or several cells served by the relay node;

said base station sending the MBSFN Area configuration information to the relay node through M2 interface.

4. The method according to claim 1, wherein, after said base station receiving the configuration information, reported by said said relay node, of all cells served by said relay node, the configuration information comprises the MBMS service configuration information of all cells served by said relay node, further comprising:

determining if said base station judges that said MBMS service configuration information of said one or several cells served by the relay node corresponds to one or several MBMS sessions created by said base station, said base station sending MBMS session start request message to the relay node, and requests to create MBMS session with said one or several cells served by the relay node;

wherein said base station receiving MBMS session creating situation in the request message returned from the relay node;

said base station sending user plane data corresponding to the one or several cells with which MBMS session has been created to the relay node.

5. The method according to claim 4, wherein, when said base station judges that the MBMS service configuration information of several cells served by the relay node corresponds to several MBMS sessions created by said base station, said base station sending MBMS session start request message to the relay node, with the details below:

said base station sending a piece of an MBMS session start request message to the relay node, and said MBMS session start request message carries the request to trigger creating several MBMS sessions; or, said base station sending several MBMS session start request messages to the relay node, and each MBMS session start request message carries a request to trigger creating an MBMS session.

6. The method according to claim 4, wherein, after said base station sending user plane data corresponding to the one or several cells with which MBMS session has been created to the relay node, further comprising:

said base station receiving MBMS scheduling response message returned from the relay node.

7. The method according to claim 1, wherein, after said base station sending said MBSFN Area configuration information of said one or several cells served by the relay node to the relay node to configure said one or several cells served by the relay node to support the MBMS service, further comprising:

wherein when said base station confirms that the relay node cannot continue to conduct MBMS service, said base station sending request message for deleting configuration information of said one or several cells served by the relay node, and stops forwarding the MBMS service to the relay node;

therin, said base station confirms that the relay node cannot continue to conduct the MBMS service, with the details below:

said base station receiving M2 process of stopping receiving the MBMS service initiated and informed by the relay node; or, when M2 interface between the base station and relay node is just borne at an SCTP (Stream Control Transmission Protocol) relevance of low-layer SCTP, said base station receiving SCTP dissociation process triggered by the relay node.

8. The method according to claim 7, wherein, when said base station confirms that the relay node cannot continue to conduct said MBMS service, further comprising:

said base station deleting saved correspondence between ID information of the relay node and that of all cells served by the relay node;

said base station sending notification message of release completion of M2 interface to the relay node.

9. A base station, wherein, comprising:

receiving module, is used to receive configuration information, reported by a relay node, of all cells served by the relay node and MBSFN(Multimedia Broadcast multicast service Single Frequency Network) Area configuration information returned from an MCE(Multi-cell/Multicast Coordination Entity), wherein, the configuration information comprises MBMS(Multimedia Broadcast Multicast Service) service configuration information of all cells served by the relay node;

sending module, is used to send the configuration information, received by receiving module, of all cells served by the relay node to the MCE, and send the MBSFN Area configuration information of one or several cells served by the relay node to the relay node to configure the one or several cells served by the relay node to support said MBMS service when said MBSFN Area configuration information returned from said MCE received by the receiving module contains said MBSFN Area configuration information of said one or several cells served by the relay node.

10. The base station according to claim 9, wherein, said receiving module performs the following steps:

reporting the configuration information of all cells served by the relay node through the setup process of M2 interface after receiving the start of said relay node; and/or, said sending module is used to:

acquiring the MBSFN Area configuration information of said one or several cells served by the relay node and sending the acquired MBSFN Area configuration information to the relay node through M2 interface when the MBSFN Area configuration information returned from said MCE received by the receiving module contains said MBSFN Area configuration information of said one or several cells served by the relay node.

11. The base station according to claim 9, wherein, further comprising:

providing a memory module, which is used to save the correspondence between ID information of the relay node and that of all cells served by the relay node.

12. The base station according to claim 9, wherein, further comprising:

providing a judging module, is used to judge whether said MBMS service configuration information received by the receiving module of said one or several cells served by the relay node corresponds to one or several MBMS sessions created by the base station;

wherein when the result of judging module is yes, said sending module is also used to send MBMS session start request message to the relay node, requesting to create MBMS session with said one or several cells served by the relay node, and send user plane data corresponding to the one or several cells with which MBMS session has been created to the relay node.

13. The base station according to claim 12, wherein, said judging module is also used to judge whether the relay node can continue to conduct MBMS service;

wherein when the judging module judges that the relay node cannot continue to conduct said MBMS service, said sending module is used to send request message for deleting said configuration information of the one or several cells served to the MCE, and stopping forwarding MBMS service to the relay node.

14. The base station according to claim 13, wherein, when the judging module judges that the relay node cannot continue to conduct MBMS service, a memory module is also used to delete the saved correspondence between ID information of the relay node and that of all cells served by the relay node.

15. A method for implementing MBMS (Multimedia Broadcast Multicast Service) service when relay node is deployed in network, wherein, the method comprises:

providing the relay node reporting configuration information of all cells served by the relay node to a base station, and the configuration information comprises MBMS service configuration information of all cells served by the relay node, the MBSFN Area configuration information of all cells served by the relay node is sent to an MCE (Multi-cell/Multicast Coordination Entity) by the base station;

wherein when MBSFN (Multimedia Broadcast multicast service Single Frequency Network) Area configuration information returned from the MCE received from said base station contains said MBSFN Area configuration information of one or several cells served by the relay node;

the relay node receiving said MBSFN Area configuration information of said one or several cells served by the relay node from the base station;

the relay node configuring corresponding one or several cells served by the relay node to support MBMS service based on the MBSFN Area configuration information, wherein, the MBMS service configuration information of all cells served by the relay node specifically comprises:

MBMS Synchronization Area ID of all cells served by the relay node; and/or, MBMS Service Area List of all cells served by the relay node.

16. The method according to claim 15, wherein, before the relay node reporting the configuration information of all cells served by the relay node to the base station, further comprising:

Acquiring via the relay node said configuration information of all cells served by the relay node from OAM equipment, and the configuration information comprises said MBMS service configuration information of all cells served by the relay node; and/or, after the relay node configuring corresponding cell to support said MBMS service based on the MBSFN Area configuration information, further comprising:

receiving in the relay node data information corresponding to MBMS service sent by the base station.

17. The method according to either claim 16, wherein, the relay node reporting the configuration information of all cells served by the relay node to the base station, with the details below:

reporting the configuration information of all cells served by the relay node to the base station through setup procedure of M2 interface after start of the relay node.

18. The method according to claim 15, wherein, after the relay node reporting said configuration information of all cells served by the relay node to the base station, further comprising:

the relay node receiving a MBMS session start request message sent by the base station, and said MBMS session start request message requests the base station to create said MBMS session with said one or several cells served by the relay node;

said relay node returning creating situation of the MBMS session in the request message to the base station;

said relay node receiving user plane data of the one or several cells with which MBMS session has been created to the base station.

19. The method according to claim 18, wherein, said relay node receives said MBMS session start request message from the base station, with the details below:

said relay node receiving a piece of said MBMS session start request message sent from the base station, and said MBMS session start request message carries the request to trigger creating several MBMS sessions; or, said relay node receiving several of said MBMS session start request messages sent from the base station, and each MBMS session start request message carries a request to trigger creating an MBMS session.

20. The method according to claim 15, wherein, after said relay node configuring corresponding cell to support said MBMS service based on the MBSFN Area configuration information, further comprising:

said relay node informing the base station that the relay node cannot continue to conduct said MBMS service in the following mode:

said relay node initiating M2 process of stopping receiving MBMS service and informing this stoppage to the base station; or, when M2 interface between the relay node and said base station is just borne at an SCTP (Stream Control Transmission Protocol) relevance of low-layer SCTP, said relay node triggering the process of SCTP dissociation to the base station.

21. A method for implementing MBMS (Multimedia Broadcast Multicast Service) service when a relay node is deployed in network, wherein, the method comprises:

reporting relay node configuration information of all cells served by the relay node to a base station, and the configuration information comprises MBMS service configuration information of all cells served by the relay node;

sending the MBMS service configuration information of all cells served by the relay node to an MCE (Multi-cell/Multicast Coordination Entity) by the base station;

wherein when MBSFN (Multimedia Broadcast multicast service Single Frequency Network) Area configuration information returned from the MCE received from said base station contains said MBSFN Area configuration information of one or several cells served by the relay node, the relay node receiving said MBSFN Area configuration information of said one or several cells served by the relay node from the base station;

configuring the relay node to correspond to one or several cells served by the relay node to support MBMS service based on the MBSFN Area configuration information, wherein, the MBMS service configuration information of all cells served by the relay node specifically comprises:

MBMS Synchronization Area ID of all cells served by the relay node; and/or, MBMS Service Area List of all cells served by the relay node.

* * * * *